United States Patent
Dimmick et al.

(10) Patent No.: US 7,457,495 B2
(45) Date of Patent: Nov. 25, 2008

(54) METHOD OF FILTERING OPTICAL SIGNALS WITH A CAPILLARY WAVEGUIDE TUNABLE OPTICAL DEVICE

(75) Inventors: Timothy E. Dimmick, Oviedo, FL (US); Kevin H. Smith, West Melbourne, FL (US); Douglas J. Markos, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/538,939

(22) Filed: Oct. 5, 2006

(65) Prior Publication Data

US 2008/0085079 A1  Apr. 10, 2008

(51) Int. Cl.
*G02B 6/34* (2006.01)
(52) U.S. Cl. .............. 385/37; 385/39; 385/27; 385/30; 385/10; 385/28; 385/29; 385/140; 398/79; 398/82; 398/84; 398/85; 398/87; 398/92
(58) Field of Classification Search ............ 385/1–12, 385/14–16, 24, 27, 39, 37, 123, 140, 28–29; 398/79, 82, 84–85, 87, 92
See application file for complete search history.

(56) References Cited

U.S. PATENT DOCUMENTS

| | | | |
|---|---|---|---|
| 4,823,166 A | | 4/1989 | Hartog et al. |
| 4,986,624 A | * | 1/1991 | Sorin et al. ............... 385/30 |
| 5,102,232 A | | 4/1992 | Tanabe et al. |
| 5,774,619 A | | 6/1998 | Bruesselbach |
| 5,825,804 A | | 10/1998 | Sai |
| 6,011,881 A | * | 1/2000 | Moslehi et al. ........... 385/10 |
| 6,052,497 A | | 4/2000 | Graebner |
| 6,104,852 A | * | 8/2000 | Kashyap ................... 385/123 |
| 6,295,304 B1 | * | 9/2001 | Koch et al. ............... 372/6 |

(Continued)

FOREIGN PATENT DOCUMENTS

KR  10-2004-0033976  4/2004

(Continued)

OTHER PUBLICATIONS

U.S. Appl. No. 11/538,954, Timothy E. Dimmick, et al.

(Continued)

*Primary Examiner*—Brian Healy
*Assistant Examiner*—Guy G Anderson
(74) *Attorney, Agent, or Firm*—Darby & Darby PC; Robert J. Sacco

(57) ABSTRACT

A method of filtering optical signals (300) utilizing an optical fiber (100A-100D). The method of filtering optical signals (300) includes the steps (304) selecting an optical fiber (100A-100D) coupled to a source of optical signals, (306) disposing a core (102) in the bore (103) of the optical fiber (100A-100D) formed of a core material (105), (308) selecting a core material (105) to provide a waveguide within the optical fiber (100A-100D), (310) disposing an optical grating (114-1) in a first optical cladding layer (104) disposed about the core (102), (312) propagating an optical signal within the optical fiber (100A-100D) guided substantially within the core (102), (314) modifying a propagation path of selected wavelengths comprising said optical signal with the optical grating (114-1), and (316) determining selected wavelengths for which the propagation path is modified by selectively varying an energetic stimulus to the core (102) thereby tuning the waveguide.

30 Claims, 8 Drawing Sheets

U.S. PATENT DOCUMENTS

| | | | |
|---|---|---|---|
| 6,389,200 B1 | 5/2002 | Foltzer | |
| 6,563,985 B2 | 5/2003 | Yin et al. | |
| 6,608,952 B2 | 8/2003 | Eggleton et al. | |
| 6,768,839 B2* | 7/2004 | Blomquist et al. | 385/37 |
| 6,804,041 B1* | 10/2004 | Giakos | 359/296 |
| 6,819,845 B2* | 11/2004 | Lee et al. | 385/122 |
| 6,859,567 B2* | 2/2005 | Galstian et al. | 385/1 |
| 6,859,583 B2 | 2/2005 | Lachance et al. | |
| 7,027,699 B2 | 4/2006 | Tao et al. | |
| 7,224,881 B2* | 5/2007 | Aoki et al. | 385/140 |
| 2003/0053774 A1 | 3/2003 | Blomquist | |
| 2004/0151433 A1* | 8/2004 | Galstian et al. | 385/37 |
| 2005/0018945 A1 | 1/2005 | Dunphy et al. | |
| 2006/0088267 A1 | 4/2006 | Fukuda et al. | |

FOREIGN PATENT DOCUMENTS

| | | |
|---|---|---|
| WO | WO 01/93466 A2 | 12/2001 |
| WO | WO 2004/001357 A1 | 12/2003 |

OTHER PUBLICATIONS

U.S. Appl. No. 11/538,947, Timothy E. Dimmick et al.

Markos, Doug, et al., "Bragg Grating Temperature Sensor in Photosensitive Capillary Waveguide" Optical Fiber Sensors (OFS) Conference, Oct. 23, 2006 (Oct. 23, 2006) XP002474414 Cancun Mexico.

* cited by examiner

METHOD OF FILTERING OPTICAL SIGNALS WITH A CAPILLARY WAVEGUIDE TUNABLE OPTICAL DEVICE

BACKGROUND OF THE INVENTION

1. Statement of the Technical Field

The invention concerns fiber optic devices, and more particularly, a method of filtering optical signals utilizing fiber optic devices having capillary waveguides.

2. Description of the Related Art

Optical fibers are used for data transmission within Dense Wavelength Division Multiplexed (DWDM) based networks. Devices within DWDM based networks transmit a number of signals through a single optical fiber. This is accomplished by transmitting each signal at a different wavelength along the longitudinal axis of the optical fiber. Consequently, DWDM based networks also include devices at a distal end of the optical fiber to filter a signal with a specific wavelength from a set of received signals. Tunable optical bandpass filters are often used for this purpose. In general, it is desirable for these filter devices to provide (1) wide tuning range, (2) negligible cross-talk with adjacent channels, (3) fast tuning speed, (4) low insertion loss, (5) polarization insensitivity and (6) stability with respect to environmental changes.

Various techniques are known for the purpose of implementing optical band pass filters. One such technique makes use of a fiber optic grating system. Fiber optic grating systems filter or scatter particular wavelengths of light propagating along the length of the fiber. Fiber gratings are formed by creating a periodic perturbation of the properties of the fiber. Typically, the periodic perturbation is with respect to the refractive index of the core. For example, a fiber optic grating system can include a core with a specific refractive index that varies along the length of the fiber.

Two basic types of grating systems which are known in the art include long period gratings and short period Bragg gratings. Short period fiber gratings are generally characterized as having a sub-micrometer period. These types of devices operate by coupling light from the forward propagating core mode to a backward propagating core mode. In general, the short period fiber Bragg grating will have selected narrow band reflection of specific wavelengths. Short period grating filters are commonly tuned by applying stress to the grating.

In contrast, long period gratings in optical fibers typically have a period in the range of a few tens of micrometers to 1 millimeter. Such long period grating promote coupling between forward propagating core modes and co-propagating cladding modes. Long period gratings generally attenuate a certain wavelength and offer wider bandwidths than short period gratings.

Various techniques have been proposed for tuning optical filters as described herein. For example, special materials have been used to form the cladding material surrounding the optical fiber core. These materials interact with optical energy extending into the cladding. Changing the index of refraction for these cladding materials tunes the frequency response of the device. One example of such a device is an optical fiber with air channels or capillaries in the cladding region of the fiber. The capillaries contain a fluid having a specific index of refraction. A long period grating is inscribed in the core which couples light of certain wavelengths from a forward propagating core mode into forward propagating cladding modes. Power at these wavelengths is attenuated. The response of the filter is tuned by moving the fluid into and out of the region where the grating is provided. Changing the position of the fluid in this way has been used to change the attenuation and/or wavelength of the transmission notch.

Other methods for tuning optical filters are also known. For example, a fiber can be physically stressed to modify its frequency response. Acousto-optic tunable filters use flexural waves propagating along a length of the fiber to tune the reflection wavelength of the optical grating. An electro-optic approach can also be used to modify the filter response. In particular, a long period grating can be formed in a core of a specialty fiber. A thin inner cladding of silica can be disposed over the core and an electro-optic outer cladding can be formed over the inner cladding. An applied voltage is used to change the refractive index of the outer cladding. This modification of the index of refraction of the outer cladding tunes the wavelength that is filtered.

SUMMARY OF THE INVENTION

A method of filtering optical signals in a capillary waveguide tunable optical device is provided. The method includes propagating optical signals through a core disposed in an optical fiber. The optical fiber is coupled to a source of optical signals. The optical signals are filtered by modifying the propagation path of selected wavelengths comprising the optical signal. A tunable waveguide is formed from a core material that has an index of refraction that is continuously variable over a predetermined range of values responsive to an energetic stimulus and a first cladding layer disposed about the core. The propagation path of the selected wavelengths is modified by an optical grating disposed in a first cladding layer disposed about the core. The selected wavelengths are determined by selectively varying the energetic stimulus to the core for tuning the waveguide.

According to a preferred embodiment of the invention, the method of filtering optical signals is comprised of several steps. The method can begin with providing an optical fiber coupled to a source of optical signals. The optical fiber includes a core disposed within the optical fiber. The core is formed of a core material which is selected to form a waveguide supporting the propagation of light substantially within the core of the optical fiber. The method also includes disposing an optical grating in a first cladding layer disposed about the core. With the fiber formed in this way, the method continues with the step of propagating an optical signal within the core. Thereafter, a propagation path of selected wavelengths comprising the optical signal is modified by the optical grating. The selected wavelengths for which the propagation path is modified are determined by selectively varying an energetic stimulus to the core. Accordingly, the energetic stimulus effectively tunes the waveguide.

The step of selecting a core material involves selecting a core material having an index of refraction that is continuously variable over a predetermined range of values responsive to the energetic stimulus. The step of varying the energetic stimulus involves selecting an energetic stimulus such as thermal energy, photonic energy, magnetic field or an electrical potential.

The step of disposing an optical grating in a first cladding layer disposed about the core involves selecting a material for the first optical cladding layer that has a first cladding layer index of refraction that is permanently selectively configurable responsive to an exposure to an energetic stimulus. For example, the energetic stimulus can be photonic energy such as ultraviolet (UV) light.

According to a preferred embodiment of the invention, the step of providing a waveguide within the optical fiber involves disposing a bore in the optical fiber. The bore is axially disposed within the first optical cladding layer. The method also includes filling the bore with a liquid or fluid. The liquid or fluid filled bore thereby forms the core of the optical fiber. According to a preferred embodiment of the invention, the step of selecting a fluid to fill the bore includes selecting the fluid to have an index of refraction $n_1$ that is continuously variable over a predetermined range of values. In particular, the index of refraction is selected to be variable responsive to an energetic stimulus such as thermal energy, photonic energy, magnetic field or an electrical potential. The range of values of the index of refraction is chosen so as to produce a capillary waveguide that supports a single propagating core mode throughout the desired wavelength tuning range.

According to one embodiment of the invention, the step of disposing an optical grating in a first cladding layer disposed about the core involves several steps. The steps can include forming an optical grating inscribed in the first cladding layer. The optical grating is formed by providing in the first cladding layer an index of refraction that is modulated in a periodic pattern along a length of the optical fiber. According to another embodiment of the invention, this step further involves selecting the periodic pattern to include a sinusoidal variation in the index of refraction. According to yet another embodiment of the invention, this step further includes selecting the optical grating to be an apodized periodic grating, a chirped grating, a blazed grating, or an amplitude modulated grating.

According to another aspect of the invention, the method includes the steps of disposing a second optical cladding layer on the first optical cladding layer and selecting an index of refraction of the second optical cladding layer less than the index of refraction of the core.

With this method of filtering optical signals, certain selected wavelengths comprising the optical signal propagate freely through the core forming the waveguide of the device. Other selected wavelengths are filtered as a result of interaction with the optical grating. The selected wavelengths are determined by the grating period and the core and cladding dimensions and refractive indices. The waveguide is tuned by selectively varying the energetic stimulus to the core. The method of filtering optical signals includes the steps of modifying the propagation path of optical signals. In one embodiment, this is accomplished by designing the optical grating to cause coupling of selected wavelengths to forward propagating cladding modes. Alternatively, the optical grating is designed to modify the propagation path of selected wavelengths by changing a direction in which the selected wavelengths of the optical signals are propagating. For example, this step can include changing the direction of travel of selected wavelengths form a forward propagating direction of travel to a reverse propagating direction of travel.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Figure 1A:
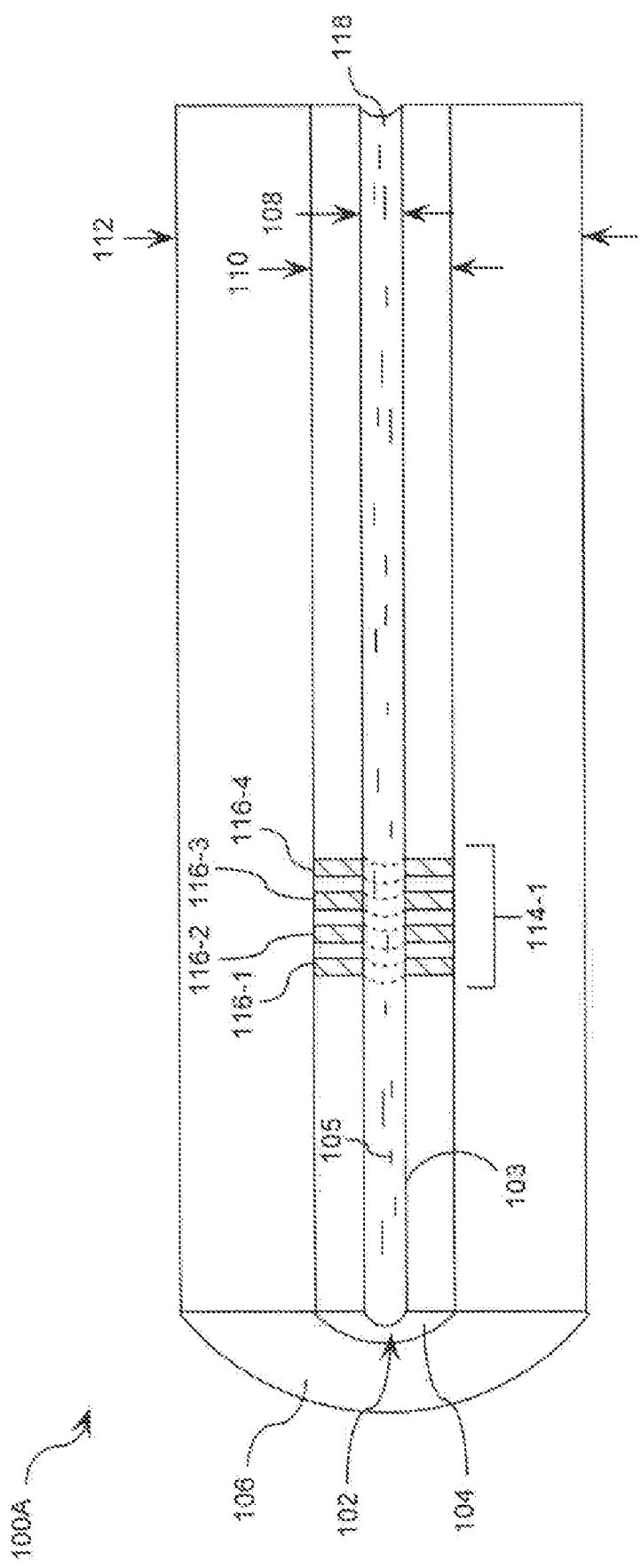
FIG. 1A is a cross-sectional view of an optical fiber that is useful for understanding the invention.

FIG. 1A is a cross-sectional view of an optical fiber 100A utilized in a method of filtering optical signals in a capillary waveguide tunable optical device. The optical fiber 100A is an elongated structure comprised of a cylindrical core 102, a first optical cladding layer 104, and a second optical fiber cladding layer 106. In the preferred embodiment of the invention, the core 102 is cylindrical. However, it should be understood that the cross-section of the core 102 can be of any shape including circular, elliptical, square, rectangular, and octagonal. The core 102 is comprised of a core material 105 to provide a waveguide for the propagation of a desired optical signal through the optical fiber 100A. Such core materials include and media having an index of refraction and/or optical loss that is variable in response to an energetic stimulus, such as thermal energy, photonic energy, an electrical potential, or a magnetic field.

According to a preferred embodiment of the invention shown in FIG. 1A the core 102 is comprised of a bore 103 axially disposed within the first optical cladding layer 104. The bore 103 is further filled with a working fluid or liquid 105 having an index of refraction $n_1$ that is continuously variable over a pre-determined range of values responsive to thermal energy (temperature). With a working fluid 105 disposed within the bore, optical fiber 100A can be viewed as a capillary waveguide. Light can propagate within the core 102 in a manner which will be readily understood by those skilled in the art. The working fluid can be selected with an index of refraction $n_1$ in accordance with a particular optical fiber application. For example, the working fluid is advantageously selected with an index of refraction $n_1$ from 1.4 to 1.8 at room temperature (approximately 25° Celsius). Such working fluids include Series A fluids, Series B fluids, and Series M fluids available from Cargille Labs, Inc., of Cedar Grove, N.J. Still, the invention is not limited in this regard. Any working fluid with an index of refraction $n_1$ that is variable in response to thermal energy can be used without limitation.

Figure 1B:
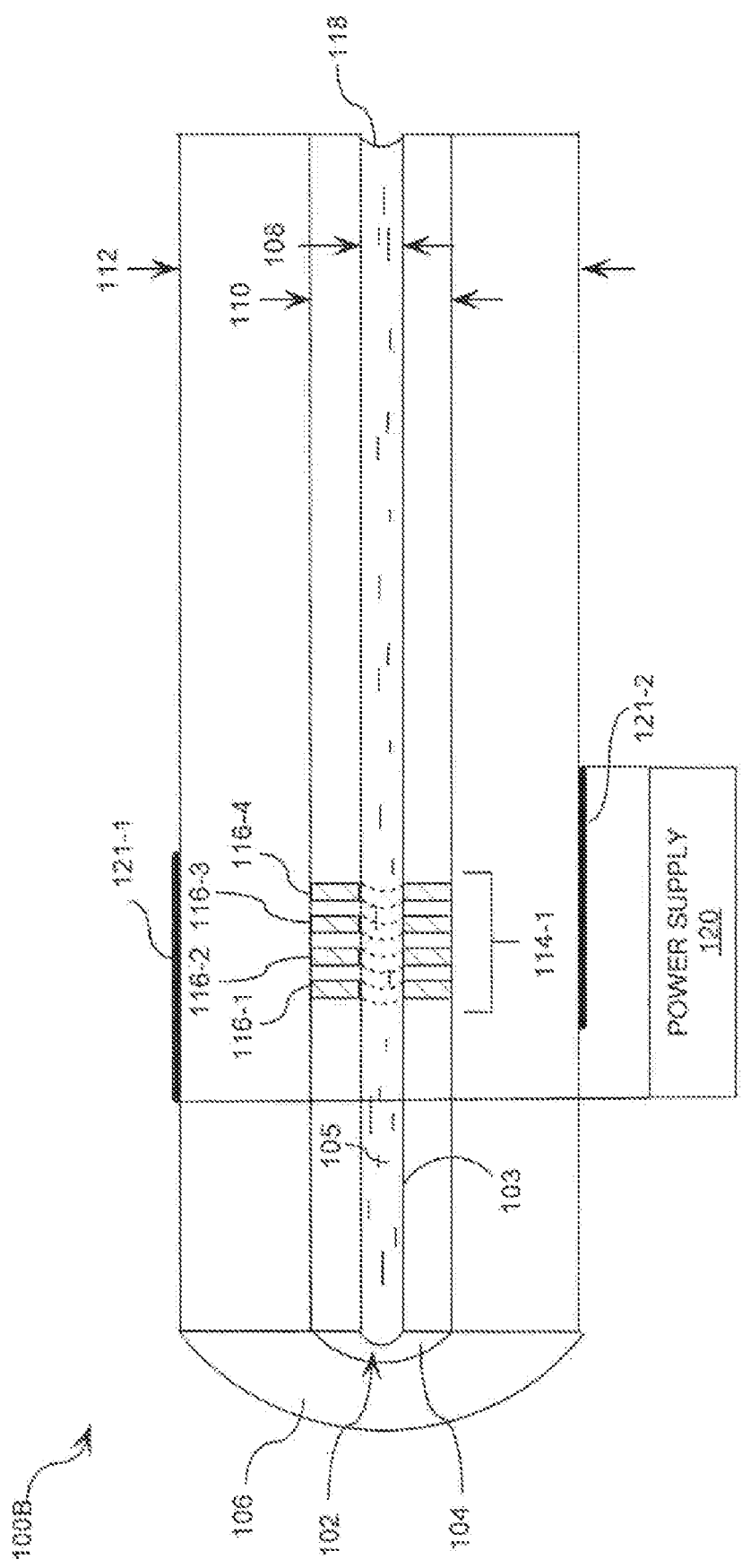
FIG. 1B is a cross-sectional view of an optical fiber that is useful for understanding the invention.

Another embodiment of the invention is disclosed in FIG. 1B, which shows an optical fiber 100B. The optical fiber 100B can be utilized in a method of filtering optical signals in a capillary waveguide tunable optical device. The core 102 is comprised of a bore 103 axially disposed within the first optical cladding layer 104. The bore 103 is further filled with an electro-optic working fluid or liquid 105 having an index of refraction $n_1$ that is continuously variable over a predetermined range of values responsive to an electrical potential. As shown in FIG. 1B, the electric potential can be applied with an external power supply 120 connected to a pair of electrodes 121-1, 121-2. The position of the electrodes is advantageously chosen to apply an electric field to the electro-optic working fluid without interfering with the transmission of optical signals within the core 102. For example, it can be advantageous to position the electrodes external to the second optical fiber cladding layer 106 as shown in FIG. 1B. However, the invention is not limited in this regard. Any arrangement of electrodes can be used for this purpose, provided that they can effectively vary an electric field applied to the core 102.

The electro-optic working fluid 105 can be selected with an index of refraction $n_1$ in accordance with a particular optical fiber application. According to one aspect of the invention, the electro-optic working fluid is selected with an index of refraction $n_1$ from 1.4 to 1.8 at room temperature (approximately 25° Celsius). Such electro-optic working fluids include liquid crystals and/or electro-optic polymers. Still, the invention is not limited in this regard. Any electro-optic material with an index of refraction $n_1$ that is variable in response to an electrical potential can be used without limitation.

Figure 1C:
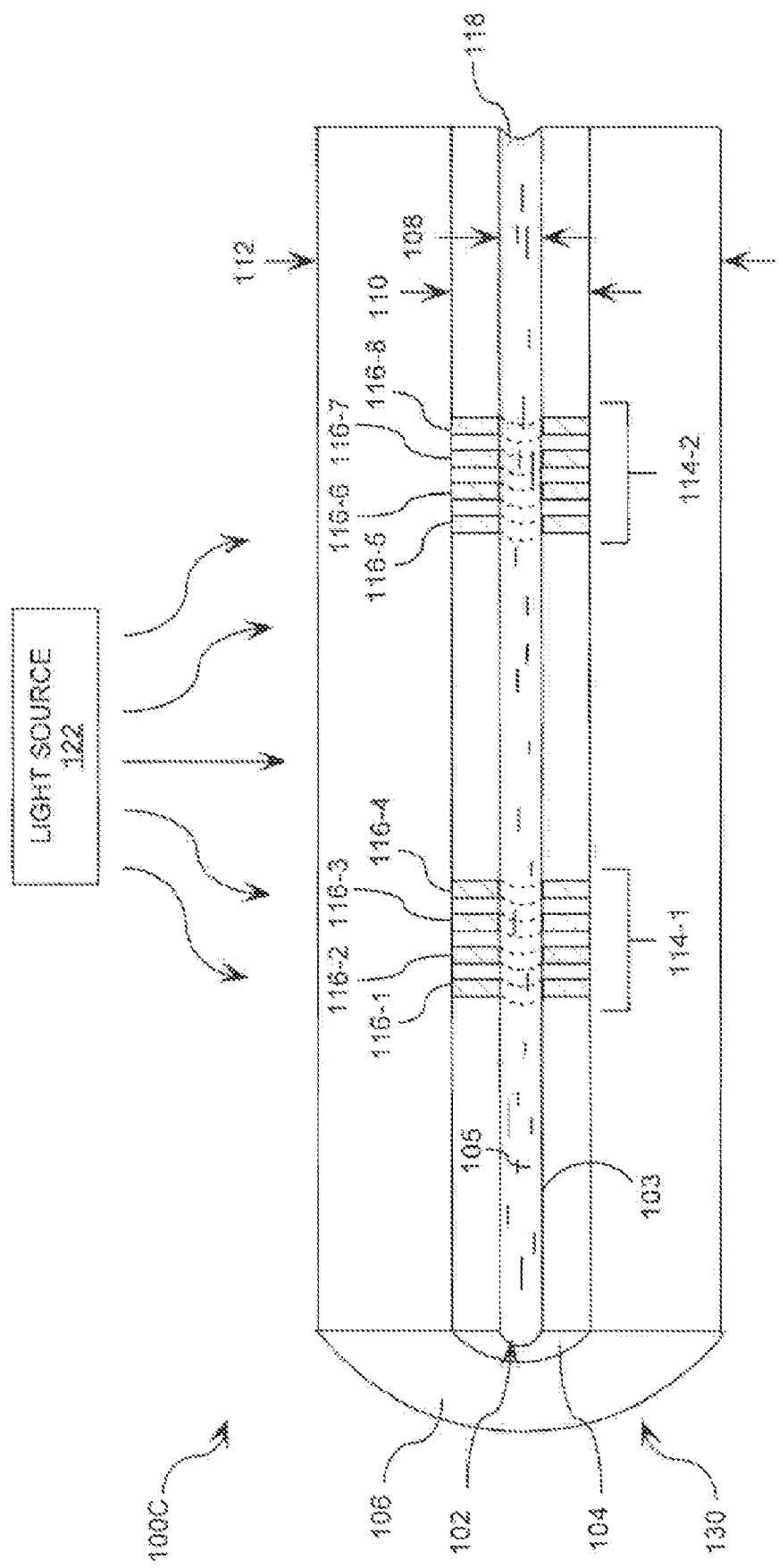
FIG. 1C is a cross-sectional view of an optical fiber that is useful for understanding the invention.

Another embodiment of the invention is disclosed in FIG. 1C which shows a cross-sectional view of an optical fiber 100C that can be utilized in a method of filtering optical signals in a capillary waveguide tunable optical device. The core 102 is comprised of a bore 103 axially disposed within the first optical cladding layer 104. The bore 103 is further filled with a working fluid or liquid 105 having an index of refraction $n_1$ or an absorption that is continuously variable over a predetermined range of values responsive to photonic energy. As shown in FIG. 1C, the photonic energy can be applied with an external light source 122. It should be appreciated that the external light source 122 can illuminate the optical fiber 100C from the side as shown in FIG. 1C. Alternatively, the external light source 122 can illuminate the optical fiber 100C from an end 130 of the fiber 100C where light is guided by the fiber 100C and propagates with a signal being filtered. However, the invention is not limited in this regard. Any suitable means of illumination known in the art can be used for this purpose. The working fluid can be selected with an index of refraction $n_1$ in accordance with a particular optical fiber application. In this regard, the working fluid is selected with an index of refraction $n_1$ from 1.4 to 1.8 at room temperature (approximately 25° Celsius). Such working fluids include doped fluids or fluids exhibiting a Kerr nonlinearity. Still, the invention is not limited in this regard. Any working fluid with an index of refraction $n_1$ or absorption that is variable in response to the application of photonic energy can be used without limitation.

Figure 1D:
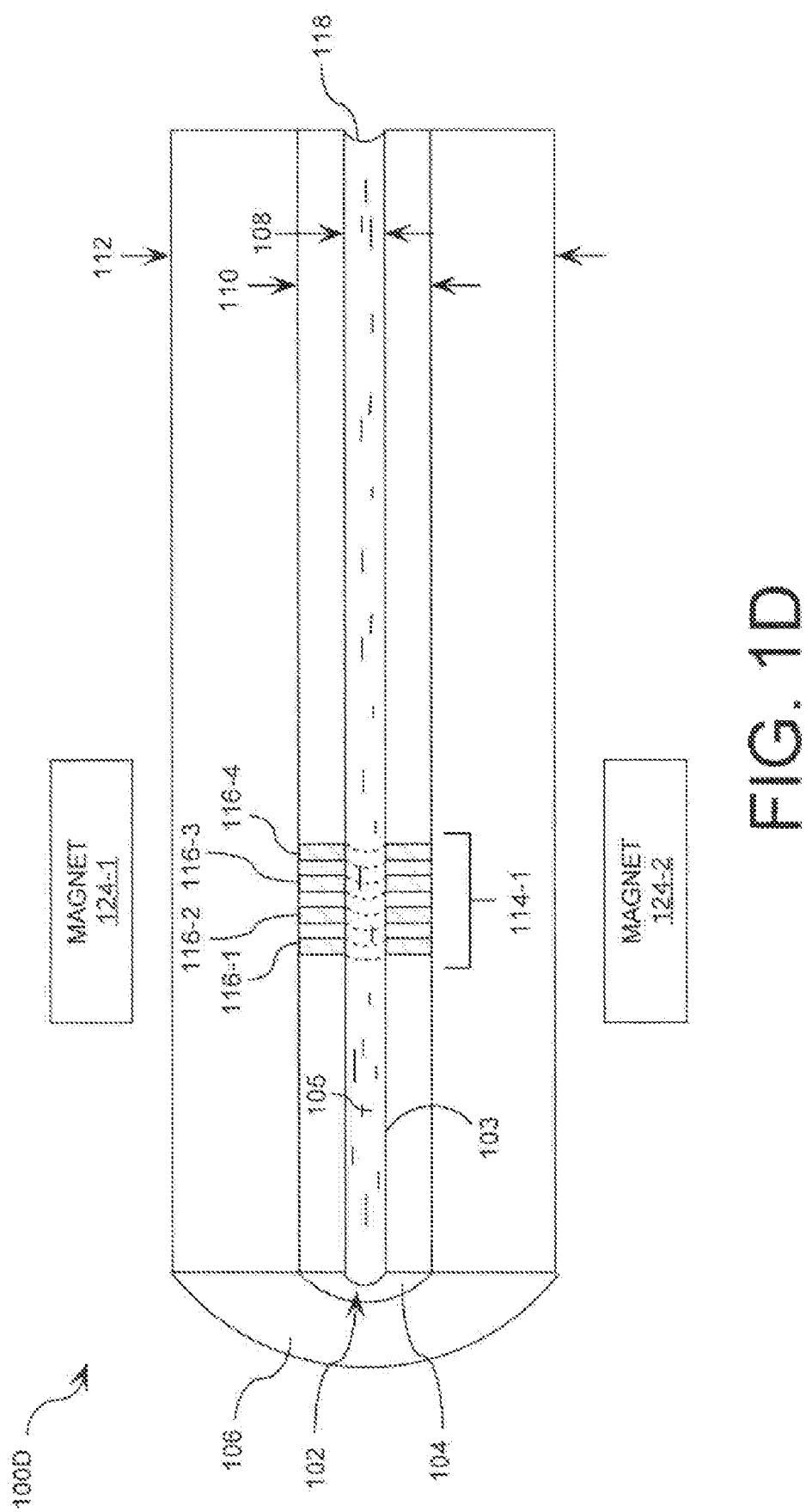
FIG. 1D is a cross-sectional view of an optical fiber that is useful for understanding the invention.

Another embodiment of the invention is disclosed in FIG. 1D, which shows the core 102 is comprised of a bore 103 axially disposed within the first optical cladding layer 104. The bore 103 is further filled with a working fluid or liquid 105 having an index of refraction $n_1$ that is continuously variable over a predetermined range of values responsive to a magnetic field. As shown in FIG. 1D, the magnetic field can be applied with an external magnet 124-1, 124-2. However, the invention is not limited in this regard. Any suitable mechanism known in the art can be used for this purpose. The working fluid can be selected with an index of refraction $n_1$ in accordance with a particular optical fiber application. For example, the working fluid is advantageously selected with an index of refraction $n_1$ from 1.4 to 1.8 at room temperature (approximately 25° Celsius). Still, the invention is not limited in this regard. Any working fluid with an index of refraction $n_1$ that is variable in response to a magnetic field can be used without limitation.

Referring again to FIGS. 1A-1D it can be observed that the core 102 has a diameter 108. The diameter 108 can be selected in accordance with a particular optical fiber application. It should be appreciated that the number of desired resonant modes will generally tend to dictate the sizing of the core 102. For example, in the preferred embodiment of the present invention, the core 102 has a diameter 108 chosen to produce a capillary waveguide that supports a single propagating core mode throughout the desired wavelength tuning range. The core diameter 108 is also advantageously selected to optimize the optical fiber's sensitivity to an energetic stimulus, such as thermal energy, photonic energy, magnetic field and electrical potential. It should be understood that the core diameter 108 together with the index of refraction of the core 102 and cladding materials determines the fraction of the light carried in the optical fiber 100A-100D that overlaps the core material 105. In this regard, it should be further understood that the larger the core diameter 108 the larger the fraction of light that is present in the core 102 and the larger the sensitivity to an energetic stimulus.

The first optical cladding layer 104 is disposed on the core 102. The first optical cladding layer 104 is formed of a material that has a first cladding layer index of refraction that is permanently selectively configurable responsive to an exposure to an energetic stimulus, such as photonic energy. Such materials include a glass (for example, a silica glass, a fluorozirconate glass, a fluoroaluminate glass, and a chalcogenide glass) doped with photosensitive chemical elements, a polymer doped with photosensitive chemical elements, and/or an electro-optic material doped with photosensitive chemical elements. According to a preferred embodiment of the invention, the material is selected as silica glass doped with germanium to provide ultraviolet (UV) light photosensitivity and fluorine to lower its index of refraction slightly below that of the second optical cladding layer 106. Still, the invention is not limited in this regard. Any suitable material may be used to form the first optical cladding layer 104 without limitation provided that it is sensitive to an energetic stimulus. However, it should be understood that the material used to form the first optical cladding layer 104 is selected with an index of refraction $n_2$ in accordance with a particular filtering operation. For example, the material is selected with an index of refraction $n_2$ less than the index of refraction $n_1$ of the core 102. Such an architecture provides an optical fiber with a guided mode that is substantially confined to the fluid or liquid filled core 102 and the region of the first optical cladding layer 104 nearest the core 102.

One or more optical gratings are advantageously formed on the optical fiber 100A-100D. In FIGS. 1A, 1B and 1D, a single grating 114-1 is shown. In FIG. 1C, an optical fiber with two gratings 114-1, 114-2 is shown. Optical gratings 114-1, 114-2 are inscribed in the first optical cladding layer 104 using any fabrication technique known in the art. Such techniques include a photo-inscribing technique using an ultraviolet laser and/or any other inscribing technique known in the art. In a preferred embodiment, ultraviolet light is used to create the gratings. An ultraviolet laser is positioned external to the fiber. The laser illuminates the fiber through a phase mask formed from a slab of silica in which there is a pattern of fine parallel grooves or troughs. The phase mask diffracts the light, thereby generating an interference pattern. The result is regions of high and low intensity UV light, which alternates along the length of the fiber in the region where the grating is to be formed. The extent to which the index of refraction varies as a result of this process will depend on several factors. For example, these factors can include the composition of the first optical cladding layer 104, and the exposure time and intensity of the ultraviolet light.

According to an embodiment of the invention, the optical gratings 114-1, 114-2 are inscribed in the first optical cladding layer 104 such that the optical gratings 114-1. 114-2 are axially disposed about the core 102. This configuration results in a periodically varying refractive index $n_2$ of the first optical cladding layer 104 along its longitudinal axis. Still, the invention is not limited in this regard. The optical gratings 114-1, 114-2 can be inscribed in the first optical cladding layer in a chirped manner. This configuration results in optical gratings 114-1, 114-2 having a grating period that varies along its longitudinal axis. The optical gratings 114-1, 114-2 can also be inscribed in a manner such that the optical gratings 114-1, 114-2 are apodized periodic gratings. The optical gratings 114-1, 114-2 can also be inscibed in a manner such that the optical gratings 114-1, 114-2 are blazed gratings.

Each optical grating 114-1, 114-2 can be designed so that an index of refraction of the first optical cladding layer 104 is modulated or varies in a periodic manner along a portion of the length of the optical fiber. For convenience, this periodic variation is illustrated in FIGS. 1A-1D as a series of alternating ring-like structures 116-1, 116-2, 116-3, 116-4, 116-5, 116-6, 116-7, and 116-8. However, it should be understood that the actual periodic variation of the index of refraction in the first optical cladding layer 104 does not typically vary in such an abrupt manner. Instead, the index of refraction is varied in a more continuous way. For example, in the embodiment shown the value of the index of refraction is preferably varied in a sinusoidal manner. The amplitude of the variation in the index of refraction can be constant along the length of the optical grating or it can be modulated along the length of the optical grating. It is known in the art that by modulating the amplitude of the variations in the index of refraction along the length of a grating, it is possible to achieve various different effects upon optical energy propagated along the length of an optical fiber. Any of these known amplitude modulation techniques can be used with the present invention.

In FIGS. 1A, 1B and 1D, the optical fiber 100A, 100B and 100D may be configured as a tunable notch filter that couples light between a forward propagating core mode and a backward propagating core mode exhibiting a transmission minimum at a wavelength $\lambda_B$ (the Bragg wavelength) by selecting a grating period ($\Lambda_{grating}$) using Equation (1):

$$\Lambda_{grating} = \lambda_B / (2 \times n_{eff}) \quad (1)$$

where $n_{eff}$ is an effective index of refraction of the mode guided by the core 102 of the optical fiber 100A, 100B and 100D. The effective index of refraction is the average of the index of refraction of the core 102 and the cladding layers 104, 106 weighted by the fraction of the optical power of the mode occupying those regions. In a fluid filled capillary as provided in FIGS. 1A-1D, the Bragg wavelength will change as a function of the index of refraction of the fluid because the effective index of refraction is dependent in part on the index of refraction of the fluid. If the index of refraction of the fluid can be varied by the application of an energetic stimulus (e.g., thermal energy), the Bragg wavelength or notch wavelength can be selectively controlled in this way.

Coupled-mode theory (CMT) can be used to model the spectral response of the gratings 114-1, 114-2 shown in FIGS. 1A-1D. In general, CMT shown that the grating strength and length, as well as the overlap of the mode field of the guided mode with the grating perturbation will determine the bandwidth and depth (attenuation) of the notch in the transmission spectrum. It should be appreciated that the optical gratings 114-1, 114-2 interact with light waves propagating along the longitudinal axis of optical fiber 100A-100D. This interaction depends on the grating period of each optical grating 114-1, 114-2. For example, each optical grating 114-1, 114-2 has a short grating period. The interaction between these optical gratings 114-1, 114-2 and light waves guided by the core 102 causes light waves of certain wavelengths to couple to a backward propagating core mode. In an alternate aspect of the invention, each optical grating 114-1, 114-2 has a long grating period. The interaction between these optical gratings 114-1, 114-2 and light waves guided by the core 102 causes light waves of certain wavelengths to couple to forward propagating cladding modes.

Still referring to FIG. 1A, the first optical cladding layer 104 has a diameter 110. The diameter 110 can be selected in accordance with a particular optical fiber 100A application. According to a preferred aspect of the invention, the first optical cladding layer 104 advantageously has a diameter 110 that optimizes the interaction of the light propagating in the guided mode with the optical grating 114-1, 114-2 and the core material 105 occupying the bore 103. However, the invention is not limited in this regard. Any suitable diameter 110 can be used in accordance with particular filtering applications.

The second optical cladding layer 106 is disposed on first optical cladding layer 104. The second optical cladding layer 106 is comprised of dielectric material with a refractive index $n_3$. Such materials could include fused silica and/or fused quartz. According to a preferred aspect of the invention, the material forming the second optical cladding layer 106 is selected with a refractive index $n_3$ less than the refractive index $n_1$ of the fluid occupying core 102. It should be appreciated that the refractive index $n_3$ could be less than or greater than the refractive index $n_2$ of the first optical cladding layer 104.

As shown in FIG. 1A the second optical cladding layer 106 has a diameter 112. The diameter 112 can be selected in accordance with a particular optical fiber 100A application. According to a preferred aspect of the invention, the second optical cladding layer 106 has a diameter 112 equal to 125 micrometers. Such a diameter 112 provides for a compatibility with standard 125 micrometer diameter optical fibers and associated components and tooling. The diameter 112 also provides for a plurality of cladding modes (i.e., allowing multiple resonant bands over the infrared spectrum). However, the invention is not limited in this regard. Any suitable diameter 112 can be used in accordance with particular filtering applications and may be advantageously chosen to select certain cladding modes with which a resonant interaction is desired.

Although a protection layer is not shown in FIG. 1A a person skilled in the art will appreciate that a protection layer can be disposed on the second optical cladding layer 106 for protecting the second optical cladding layer 106 from damage due to environmental conditions and external forces. The protection layer can be comprised of a polymer coating or any other coating known in the art.

A person skilled in the art will further appreciate that the optical fiber 100A-100D can be used in various DWDM based network applications. For example, the optical fiber 100A-100D is implemented in a tunable optical filter for filtering a signal with a specific wavelength from a set of optical signals propagating along the optical fiber.

A person skilled in the art will appreciate that the optical fiber architectures in FIGS. 1A-1D are representative embodiments of an optical fiber architecture. However, the invention is not limited in this regard and any other optical fiber architecture can be used without limitation. For example, in an alternate embodiment of the invention, the optical fiber 100A-100D can be designed exclusive of a second optical cladding layer 106. In such a scenario, the first optical cladding layer 104 can be designed as a rather thick layer (for example, 125 micrometers) encompassing the fluid or liquid filled core 102. In such a scenario, a protection layer can be disposed on the first optical cladding layer 104.

Figure 2:
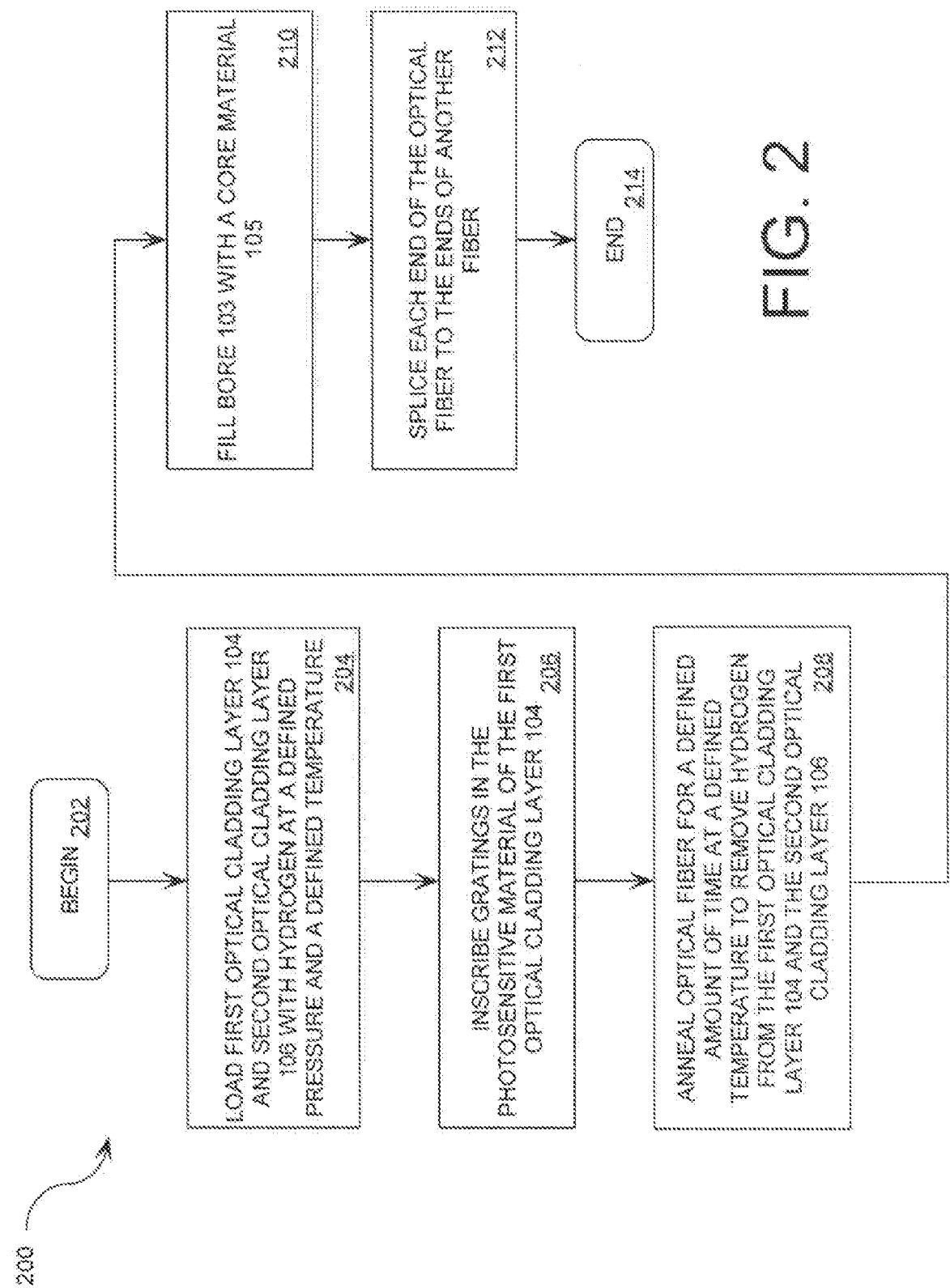
FIG. 2 is a flow diagram of a fabrication process for an optical fiber that is useful for understanding the invention.

FIG. 2 is a flow diagram of a fabrication process for the optical fiber 100A-100D. According to the preferred embodiment of the invention, the fabrication process 200 begins with step 202 and continues with step 204. In step 204, an optical fiber 100A-100D having a bore 103, a first optical cladding layer 104, and a second optical cladding layer 106 is sensitized by loading the optical fiber 100A-100D with a gas such as hydrogen or deuterium with a gas absorption method at a defined pressure (for example, 69 MegaPascal) and a defined temperature (for example, 75° Celsius), for a defined period of time (for example 4 days). Gas absorption methods are well known in the art. Thus, such methods will not be described in great detail herein. Treating the fiber with hydrogen or deuterium before exposing it to ultraviolet light can increase the light sensitivity of the material with regard to modifying the refractive index of the first optical cladding layer 104 to inscribe the optical gratings 114-1, 114-2. However, as is well known in the art, sensitization is not always required and there are other means of sensitizing the cladding layer other than hydrogen leading, such as doping with boron.

After loading the first optical cladding layer 104 and the second optical cladding layer 106 with hydrogen, control passes to step 206. In step 206, at least one short and/or long period grating is inscribed in the first optical cladding layer 104. This step may be accomplished by any method known to a person skilled in the art. For example, a method of inscribing a short period grating involves positioning the first optical cladding layer 104 behind a phase mask, and illuminating the phase mask with light of a certain wavelength (for example, 244 nanometer). This process is performed for a given amount of time (for example, 650 seconds) and a given total fluence (for example, 260 kiloJoule/centimeter$^2$). This process will expose the first optical cladding layer to light which varies in intensity in accordance with some pattern defined by the phase mask. As noted above, the first optical cladding layer is formed of a material in which the index of refraction is permanently selectively configurable in response to exposure to selected wavelengths of light. Accordingly, the exposure of the first cladding layer to such light having varying intensity will cause a variation in the index of refraction of the first cladding layer which remains after the light source is removed. The exact pattern of the variation in the index of refraction will be determined by the pattern defined by the phase mask. The pattern can be selected to form an optical grating as described herein.

In step 208, the optical fiber is annealed at a given temperature (for example, 50° Celsius) for a defined amount of time (for example, twelve (12) days) to remove hydrogen from the first optical cladding layer 104 and the second optical cladding layer 106.

In step 210, the bore 103 is filled with a core material 105 having a defined index of refraction (for example, n=1.5) that changes with an energetic stimulus, such as thermal energy, photonic energy, magnetic field, and electrical potential. This step involves placing a first end of the optical fiber into a pressurized reservoir filled with the core material 105. A second end of the optical fiber is open to ambient air. Still, the invention is not limited in this regard as there are other known methods of filling a bore 103 of an optical fiber 100A-100D with a core material 105. After step 210 is complete, control passes to step 212, where the first end and the second end of the optical fiber are spliced to the ends of another optical fiber (for example, Corning SMF-28® fiber). After this step, control passes to step 214 where fabrication process 200 ends.

A person skilled in the art will appreciate that fabrication process 200 includes only the major steps of fabricating optical fiber 100A-100D. In this regard, fabrication process 200 is simply one embodiment of a fabrication process. The invention is not limited in this regard and any other fabrication process can be used without limitation.

Figure 4:
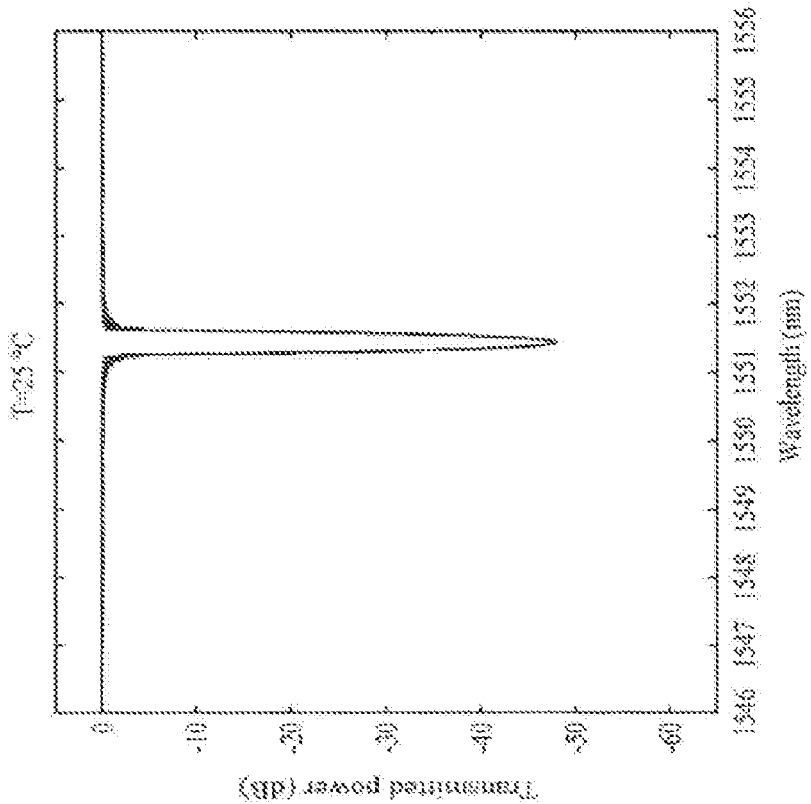
FIG. 4 is a graph illustrating a calculated transmission spectrum for an optical filter including an optical fiber with a core material at a second temperature that is useful for understanding the invention.
Figure 3:
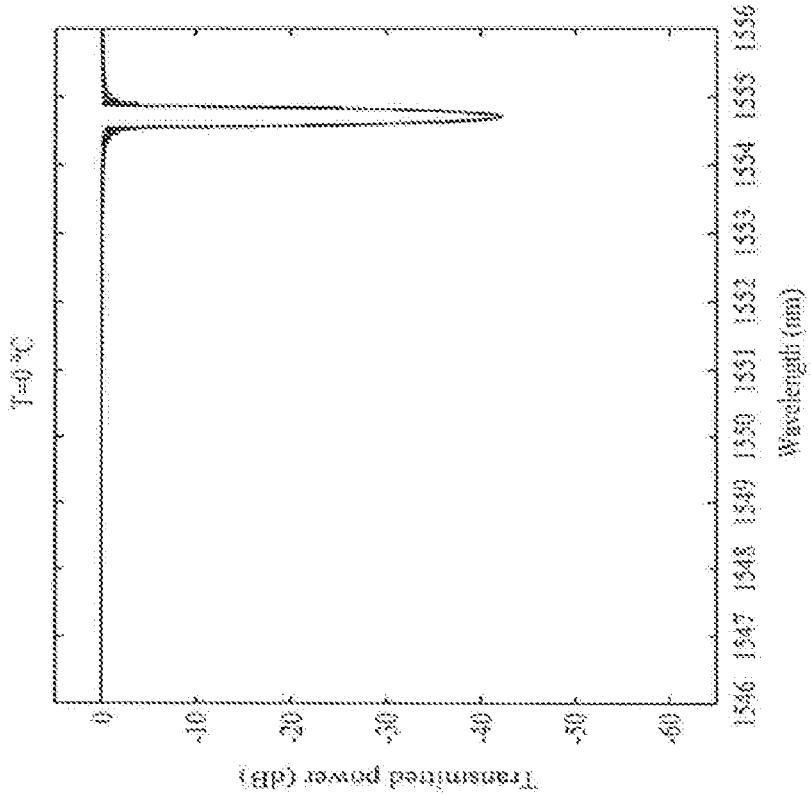
FIG. 3 is a graph illustrating a calculated transmission spectrum for an optical filter including an optical fiber with a core material at a first temperature that is useful for understanding the invention.
Figure 6:
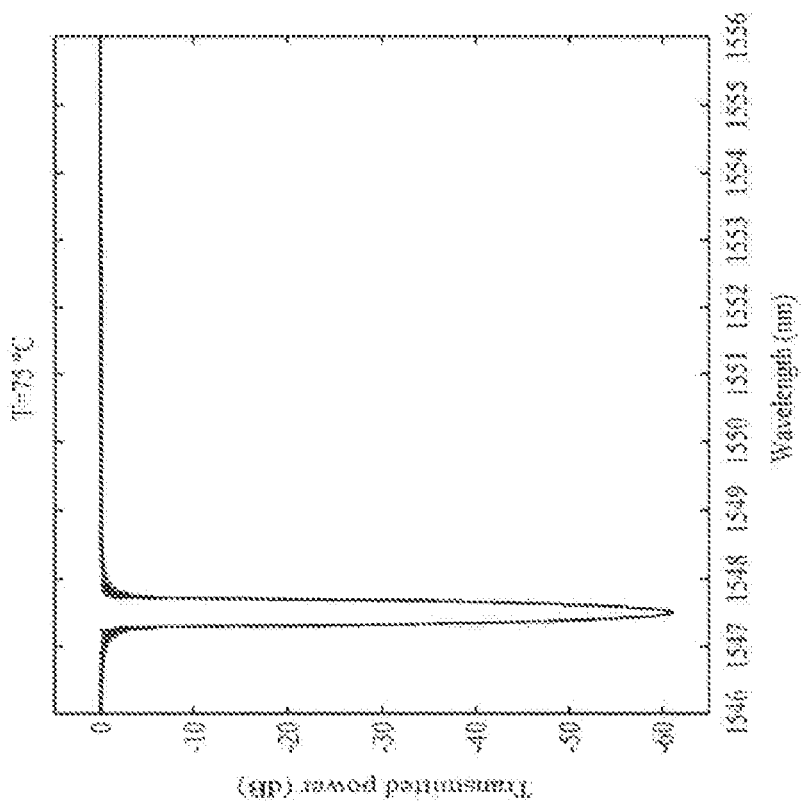
FIG. 6 is a graph illustrating a transmission spectrum for an optical filter including an optical fiber with a core material at a fourth temperature that is useful for understanding the invention.
Figure 5:
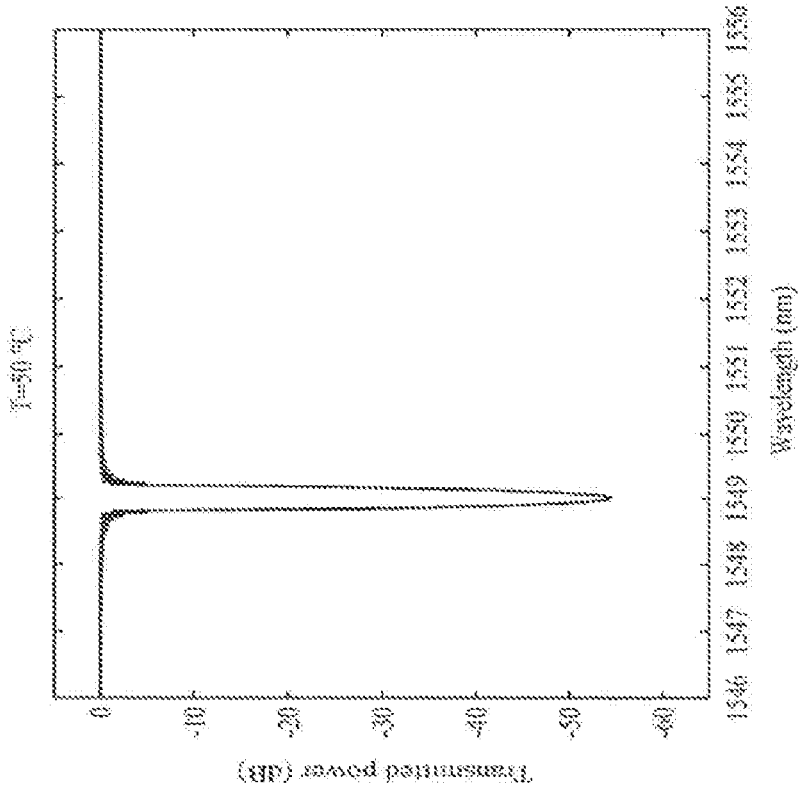
FIG. 5 is a graph illustrating a calculated transmission spectrum for an optical filter including an optical fiber with a core material at a third temperature that is useful for understanding the invention.

Referring now to FIGS. 3 through 6, there are provided a number of graphs illustrating calculated transmission spectra for an optical fiber 100A at a plurality of core material temperatures. In FIGS. 3 through 6, the energetic stimulus is thermal energy (for example, the temperature of the device is changed) and the core material is selected so that it has an index of refraction that varies in response to temperature. However, it should be understood that similar results can be achieved with different core materials that have an index of refraction that varies in response to different types of energetic stimuli. The mathematical model used to calculate transmission spectra assumed a structure such as would be produced by fabrication process 200, described above (in relation to FIG. 2). The optical fiber 100A has the following parameters: core material refractive index $n_1=1.5$ (at a temperature of 25° Celsius), core diameter refractive index temperature sensitivity $dn_1/dT=-4.01\times10^{-4}$ (° Celsius)$^{-1}$, core diameter 108 $d_1=1.4$ micrometers, first optical cladding layer 104 refractive index $n_2=1.444$, first optical cladding layer diameter 110 $d_2=40$ micrometers, second optical cladding layer 106 refractive index $n_3=1.444$, grating period $\Lambda_{grating}=535.28$ nanometers, and grating length $L_1=1$ centimeter. The model assumes a sinusoidal grating in which the average index change is $8.5\times10^{-4}$ and the difference between the maximum and minimum index values in the grating is $8.5\times10^{-4}$. FIG. 3 shows the calculated transmission spectrum for the optical fiber 100A with a core material 105 at a first temperature of 0° Celsius. Similarly, FIGS. 4 through 6 show the calculated transmission spectra for the optical fiber 100A with a core material at different temperatures selected from the group consisting of 25° Celsius, 50° Celsius, and 75° Celsius, respectively.

As shown in FIGS. 3 through 6, the temperature characteristics of the core material 105 determine the transmission spectrum of the optical fiber 100A. The notch wavelength of the optical filter can be tuned by varying a temperature of the core material 105 occupying bore 103. By using core materials that vary in response to other types of energetic stimuli, similar results can be achieved using alternative types of energetic stimuli.

A person skilled in the art will also appreciate that the optical fiber 100A can be designed to operate at different bands (for example, a C-band 1530 nanometer to 1565 nanometer and the L-Band 1565 nanometer to 1625 nanometer) in the near infrared region of the electromagnetic spectrum. For example, an effective index of a guided mode equals 1.45. A grating period equals 535.28 nanometer. Here, the wavelength at which light couples from a forward propagating core mode to a reverse propagating core mode is equal to 1552.3 nanometer ($\lambda_B=2\times1.45\times535.28$; see Equation (1) above) which resides in the C-band near infrared region of the electromagnetic spectrum. Alternatively, an effective index of a guided mode equals 1.5. A grating period equals 535.28 nanometer. Here, a wavelength at which light couples from a forward propagating mode to a reverse propagating core mode is equal to 1605.8 nanometer ($\lambda_B=2\times1.5\times535.28$; see Equation (1) above) which resides in the L-band near infrared region of the electromagnetic spectrum. In view of the forgoing, it should be appreciated that the refractive index of a core material 105, the refractive index of a first optical cladding layer 104, the refractive index of a second optical cladding layer 106 (provided the first optical cladding layer is thin), the diameter 108 of bore 103, the diameter 110 of the first optical cladding layer 104, the diameter 112 of the second optical cladding layer 106, and a grating period dictate the band in which the optical fiber 100A-D operates.

Figure 7:
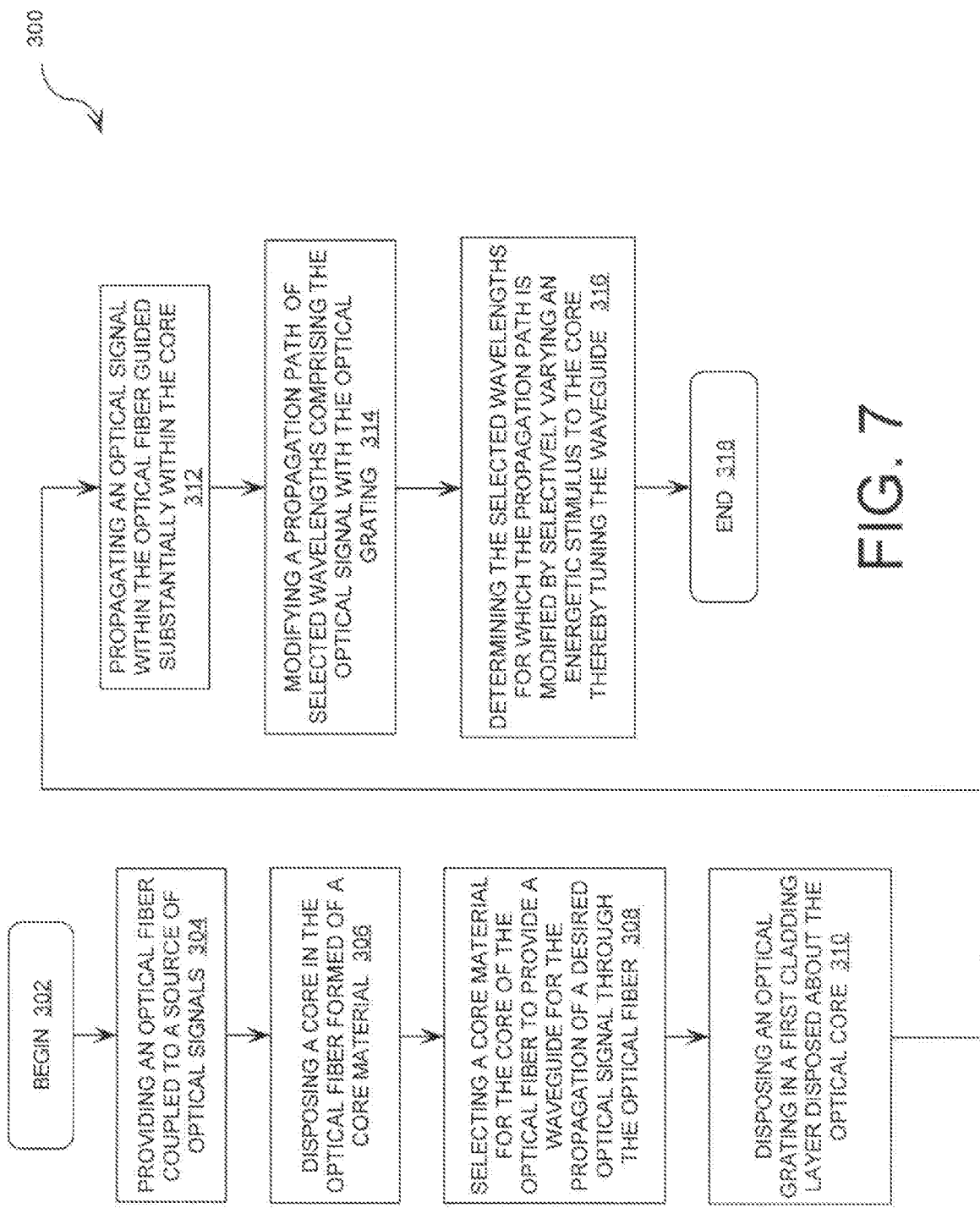
FIG. 7 is a flow diagram of a method of filtering optical signals that is useful for understanding the invention.

According to another aspect of the invention, shown in the flow diagram in FIG. 7, a method of filtering optical signals 300 in a capillary waveguide tunable optical device such as optical fiber 100A of FIG. 1 is provided. A similar method of filtering optical signals in a capillary waveguide tunable optical device could also utilize an optical fiber such as one of the optical fibers 100B-100D shown in FIGS. 1B-1D. In the preferred embodiment of the invention, the method of filtering optical signals 300 is comprised of filtering optical signals propagating in optical fiber 100A. The optical fiber 100A is coupled to a source of optical signals which could include the DWDM based network discussed. As previously discussed, the optical signals are filtered by modifying the propagation path of selected wavelengths comprising the optical signal. A tunable waveguide is formed in the optical fiber 100A by utilizing a core material 105 that has an index of refraction that is continuously variable over a predetermined range of values responsive to an energetic stimulus. The propagation path of the selected wavelengths is modified by an optical grating 114-1 disposed in a first cladding layer 104 disposed about the core 102. The selected wavelengths are determined by selectively varying the energetic stimulus to the core 102 thereby tuning the waveguide.

In the preferred embodiment of the invention, the method of filtering optical signals 300 begins with step 302 and continues with step 304) of providing an optical fiber 100A coupled to a source of optical signals. The method 300 includes the additional steps: 306) disposing a core 102 in the optical fiber 100A formed of a core material 105; 308) selecting a core material 105 to provide a waveguide within the optical fiber 100A; 310) disposing an optical grating 114-1 in a first cladding layer 104 disposed about the core 102; 312) propagating an optical signal within the optical fiber 100A guided substantially within the core 102; 314) modifying a propagation path of selected wavelengths comprising said optical signal with the optical grating 114-1; and step 316) determining selected wavelengths for which the propagation path is modified by selectively varying an energetic stimulus to the core 102 thereby tuning the waveguide. The method 300 ends with step 318.

In addition, the step 306 of disposing a core 102 in the optical fiber 100A involves selecting a core diameter 108. The step 308 of selecting a core material 105 involves selecting a core material 105 having an index of refraction that is continuously variable over a predetermined range of values responsive to an energetic stimulus. The energetic stimulus selected includes thermal energy, photonic energy, a magnetic field or an electrical potential.

The step of disposing a first optical cladding layer 104 about the core 102 includes selecting the diameter 110 of the first optical cladding layer 104 and selecting a material for the first optical cladding layer 104 that has a first cladding layer index of refraction that is permanently selectively configurable responsive to an exposure to an energetic stimulus. The selected energetic stimulus could include selecting photonic energy. The photonic energy selected includes ultraviolet (UV) light.

According to a preferred embodiment of the invention, the step of disposing a core 102 in the optical fiber 100A further involves disposing a bore 103 in the optical fiber 100A axially disposed within the first optical cladding layer 104 and selecting a liquid or fluid to fill the bore 103. The liquid or fluid filled bore 103 forms the core 102 of the optical fiber 100A. The step further involves selecting a diameter 108 of the bore 103. The diameter 108 is selected in accordance with a particular optical fiber application such as the optical fiber's sensitivity to an energetic stimulus. According to the preferred embodiment of the invention, the step of selecting the liquid or fluid to fill the bore 103 includes selecting the fluid having an index of refraction between 1.40 and 1.80 at room temperature.

According to one embodiment of the invention, the step of disposing an optical grating 114-1 in the first cladding layer 104 disposed about the core 102 involves selecting the optical grating 114-1 in the first optical cladding layer 104 which has an index of refraction that is modulated in a periodic pattern along a length of said optical fiber 100A. In another embodiment of the invention, this step further involves selecting the periodic pattern to include a sinusoidal variation in said index of refraction. In other embodiments of he invention, this step involves selecting the optical grating 114-1 to be an apodized periodic grating, a chirped grating, a blazed grating, or an amplitude modulated grating.

According to another aspect of the invention, the method of filtering optical signals 300 includes disposing a second optical cladding layer 106 on the first optical cladding layer 104. This step further involves selecting an index of refraction of the second optical cladding to be less than the index of refraction of the optical core. The step also involves selecting a diameter 112 of the second optical cladding layer 106.

With this method of filtering optical signals 300, certain selected wavelengths comprising the optical signals are free to propagate through the core 102 while other selected wavelengths are filtered. The selected wavelengths are determined by the selection of the period of the optical gratings 114-1, the index of refraction of the core material 105, the diameter 108 of the bore 103, the refractive index of the first optical cladding layer 104, the diameter 110 of the first optical cladding layer 104, the refractive index of the second optical cladding layer 106, and the diameter 112 of the second optical cladding layer 106. The core material 105 selected has an index of refraction that is continuously variable over a predetermined range of values responsive to an energetic stimulus. The waveguide is tuned by selectively varying the energetic stimulus to the core 102. Thus, the method of filtering optical signals 300 includes the steps of modifying the propagation path by coupling selected wavelengths to forward propagating modes or modifying the propagation path of selected wavelengths by changing a direction in which said selected wavelengths of said optical signals are propagating; for example changing the direction of travel of selected wavelengths from a forward propagating direction of travel to a reverse propagating direction of travel.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method of filtering optical signals, comprising:
providing an optical fiber comprising a core formed of a material with a core index of refraction that is variable in response to a first energetic stimulus, a first cladding layer disposed about said core having a first cladding layer index of refraction that is permanently selectively configurable responsive to an exposure to a second energetic stimulus, and a second cladding layer disposed about said first cladding having a fixed index of refraction that is greater than said first cladding layer index of refraction;

propagating an optical signal within said core;

modifying a propagation path of selected wavelengths comprising said optical signal with an optical grating inscribed in said first cladding layer;

selectively attenuating said selected wavelengths for which said propagation path is modified by selectively varying an energetic stimulus applied to said core.

2. The method according to claim 1, wherein said selectively varying further comprises modifying said core index of refraction of said core responsive to said first energetic stimulus.

3. The method according to claim 1, further comprising selecting said material for said core to be a fluid.

4. The method according to claim 1, wherein said propagating step further comprises propagating an optical signal comprising a plurality of wavelengths.

5. The method according to claim 1, wherein said modifying step further comprises coupling said selected wavelengths to forward propagating cladding modes.

6. The method according to claim 1, wherein said modifying step further comprises changing a direction in which said selected wavelengths of said optical signal are propagating.

7. The method according to claim 6, wherein said direction of said selected wavelengths is changed from a forward propagating direction of travel, to a reverse propagating direction of travel.

8. The method according to claim 1, further comprising selecting said energetic stimulus from the group consisting of thermal energy, photonic energy, magnetic field, and an electric potential.

9. The method according to claim 1, further comprising modifying said propagation path with a plurality of said optical gratings inscribed in said first cladding layer.

10. A method of filtering optical signals propagating through an optical fiber, comprising the steps of:

providing a core formed of a core material that is optically transmissive, said core material having a core index of refraction that is continuously variable over a predetermined range of values responsive to a first energetic stimulus;

providing a first optical cladding layer disposed about said core, said first optical cladding layer formed of a material that has a first cladding layer index of refraction that is permanently selectively configurable responsive to an exposure to a second energetic stimulus;

providing an optical signal to said core of said optical fiber; and selectively attenuating selected wavelengths comprising said optical signal by varying said first energetic stimulus applied to said core to modify a propagation path of said selected wavelengths comprising said optical signal with an optical grating inscribed in said first optical cladding layer.

11. The method according to claim 10, further comprising the step of selecting said core material to be a fluid.

12. The method according to claim 10, further comprising the step of selecting said first energetic stimulus from the group consisting of thermal energy, photonic energy, magnetic field, and an electrical potential.

13. The method according to claim 10, further comprising the step of selecting said second energetic stimulus to be photonic energy.

14. The method according to claim 13, further comprising the step of selecting said photonic energy to be ultraviolet light.

15. The method according to claim 10, further comprising the step of providing an optical grating disposed within said first optical cladding layer.

16. The method according to claim 15, further comprising the step of selecting said optical grating to be an apodized grating.

17. The method according to claim 15, further comprising the step of selecting said optical grating to be a chirped grating.

18. The method according to claim 15, further comprising the step of selecting said optical grating to be a blazed grating.

19. The method according to claim 15, further comprising the step of selecting said periodic pattern to include a sinusoidal variation in said first optical cladding layer index of refraction.

20. The method according to claim 15, further comprising the step of selecting an amplitude of said optical grating to be modulated along a length of said optical grating.

21. The method according to claim 15, further comprising the step of selecting said optical grating to include a portion of said first optical cladding layer which has an index of refraction that is modulated in a periodic pattern along a length of said optical fiber.

22. The method according to claim 21, further comprising the step of selecting said optical grating to be an apodized grating.

23. The method according to claim 21, further comprising the step of selecting said optical grating to be a chirped grating.

24. The method according to claim 21, further comprising the step of selecting said optical grating to be a blazed grating.

25. The method according to claim 21, further comprising the step of selecting said periodic pattern to include a sinusoidal variation in said first cladding layer index of refraction.

26. The method according to claim 21, further comprising the step of selecting an amplitude of said optical grating to be modulated along a length of said optical grating.

27. The method according to claim 21, further comprising the step of selecting said optical grating to be at least one short period grating.

28. The method according to claim 21, further comprising the step of selecting said optical grating to be at least one long period grating.

29. The method according to claim 10, further comprising the step of providing a plurality of optical gratings disposed within said first optical cladding layer.

30. The method according to claim 10, further comprising the step of selecting said core material to be a fluid having an index of refraction between 1.40 and 1.80 at room temperature.

* * * * *